(12) United States Patent
Ballu

(10) Patent No.: US 8,052,322 B2
(45) Date of Patent: Nov. 8, 2011

(54) PROCESS FOR CONTROL OF A SYSTEM FOR METERING AND MIXING A PRODUCT WITH SEVERAL COMPONENTS, AS WELL AS THIS METERING AND MIXING SYSTEM

(75) Inventor: Patrick Ballu, Reims (FR)

(73) Assignee: Exel Industries, Epernay (FR)

( * ) Notice: Subject to any disclaimer, the term of this patent is extended or adjusted under 35 U.S.C. 154(b) by 279 days.

(21) Appl. No.: 12/400,407

(22) Filed: Mar. 9, 2009

(65) Prior Publication Data
US 2009/0280034 A1 Nov. 12, 2009

(30) Foreign Application Priority Data

Mar. 10, 2008 (FR) ...................................... 08 01305

(51) Int. Cl.
*B01F 15/04* (2006.01)
(52) U.S. Cl. .................... 366/162.3; 366/160.4; 222/137
(58) Field of Classification Search .................. 366/132, 366/134, 151.1, 160.1–160.5, 162.3, 182.1, 366/152.1, 152.2, 162.1; 222/134, 135, 137, 222/145.1, 145.5, 145.6; 92/162 R, 261; 417/559, 569, 900, 539
See application file for complete search history.

(56) References Cited

U.S. PATENT DOCUMENTS

| | | | | | |
|---|---|---|---|---|---|
| 3,908,862 | A | * | 9/1975 | Chandra et al. ................. | 222/63 |
| 3,912,234 | A | * | 10/1975 | Peter ............................. | 366/262 |
| 4,090,695 | A | * | 5/1978 | Stone et al. ................... | 366/76.2 |
| 4,171,191 | A | * | 10/1979 | Krueger ........................ | 417/539 |
| 4,312,463 | A | * | 1/1982 | Daby ............................. | 222/134 |
| 4,881,820 | A | * | 11/1989 | Luckhoff ....................... | 366/142 |
| 4,976,546 | A | | 12/1990 | Beattie | |
| 5,071,320 | A | | 12/1991 | Anderson | |
| 6,161,956 | A | * | 12/2000 | Jerkel .......................... | 366/160.4 |
| 7,828,474 | B2 | * | 11/2010 | Ishizuka et al. ............ | 366/160.4 |
| 2006/0203609 | A1 | * | 9/2006 | Danielson et al. .......... | 366/162.1 |
| 2009/0022007 | A1 | * | 1/2009 | Massarotto .................... | 366/132 |
| 2009/0140007 | A1 | * | 6/2009 | Voss ............................. | 222/135 |
| 2009/0280034 | A1 | * | 11/2009 | Ballu ............................ | 422/105 |
| 2010/0313687 | A1 | * | 12/2010 | Ogusu .......................... | 366/132 |

FOREIGN PATENT DOCUMENTS

DE 2901438 7/1980
EP 0566976 10/1993

OTHER PUBLICATIONS

French Search Report dated Jan. 15, 2009, in priority application.

* cited by examiner

*Primary Examiner* — Charles E Cooley
(74) *Attorney, Agent, or Firm* — Young & Thompson

(57) ABSTRACT

The system comprises a first alternating pump (1) for injecting a dose of a first component (4) into a mixer (3) and a second alternating pump (2) for injecting a dose of a second component (5) into the mixer (3) sequentially relative to the first pump. The movement of the piston of each pump can be reversed from a direction of suction and expulsion of the pump to a direction of expulsion of the corresponding component, and vice versa. An injection valve (10, 11) is inserted between each pump (1, 2) and the mixer (3). The system also comprises a programmed controller (20) for initiating the movement of the piston of a pump in the direction of suction and expulsion of the volume of this pump after having determined, following the closing of the injection valve (10, 11), that the remaining volume in the pump (1, 2) is inadequate for injecting the following dose into the mixer (3).

14 Claims, 3 Drawing Sheets

PROCESS FOR CONTROL OF A SYSTEM FOR METERING AND MIXING A PRODUCT WITH SEVERAL COMPONENTS, AS WELL AS THIS METERING AND MIXING SYSTEM

This invention relates to a process for control of a system for metering and mixing a product that consists of a first component and a second component that have to be mixed in a mixer at a predetermined metering ratio. The invention also relates to such a metering and mixing system in which the control process can be implemented.

SUMMARY OF THE INVENTION

The role of this system is to issue continuously a mixture of two components in a ratio that is defined by an operator. This mixture is then used directly in applications, for example for the spraying of paint using a gun that is connected to this metering and mixing system.

The system comprises a first double-action, alternating vertical pump that can inject the first component into the mixer and a second double-action, alternating vertical pump that can inject the second component into the mixer sequentially relative to the first pump. The movement of the piston of each pump can be reversed from a direction of expulsion of the component to a direction of suction and expulsion of the component and vice versa. The circuit of each pump comprises, in addition to an intake valve and a pressure valve, an injection valve that is inserted between the pressure valve of each pump and the mixer.

A known control process comprises the following phases that consist in:
Opening the injection valve of the first pump and carrying out an injection of a predefined dose into the mixer based on said predetermined metering ratio;
Closing the injection valve of the first pump;
Opening the injection valve of the second pump and carrying out an injection of a predefined dose into the mixer based on said predetermined metering ratio;
Closing the injection valve of the second pump so as to end the phases of a first injection cycle;
Initiating the reversal of the piston of each pump in its direction of suction and expulsion when it is necessary to fill this pump again with the corresponding component; and
Again opening the injection valve of the first pump to begin the following cycle by repeating these phases.

In this known system with sequential injection, the reversal of the movement of the piston of the pump from the direction of expulsion to the direction of suction and expulsion of the pump is initiated by an end-of-travel stop of the piston of the pump.

The object of the invention is to make the operation of the system more flexible and effective by eliminating, at least to a large extent, downtime during, on the one hand, reversal of a pump, and the waiting during this time, on the other hand, before being able to continue the sequential injection, without thereby creating a differential pressure that can bring about an imbalance between the two pump circuits for not having flow rate fluctuations at the distribution outlet of the system.

A first object of the invention is a control process that is characterized by the fact that it also comprises the following phases that consist in:
Determining—with each closing of an injection valve—the volume that remains in the corresponding pump, and if the remaining volume is inadequate for the injection of the following dose, reversing the movement of the piston of the pump in the direction of suction and expulsion of the corresponding component at the same time that the injection valve of the other pump is open for the injection of the dose of the other component into the mixer.

According to other characteristics of the process according to the invention:
The remaining volume in each pump is determined continuously by detecting the movement of the piston of the pump;
The same pressure is kept in the pumps;
During the injection of the dose from the first pump, a possible leak is detected in the circuit of the second pump by observing a movement of the piston of the latter whereas its injection valve is closed, and conversely;
A leak is detected in a pressure valve or in the associated injection valve by determining a movement of the piston of the corresponding pump in the direction of suction and expulsion, whereas its injection valve is closed;
A leak in an intake valve or in the associated injection valve is detected by determining a movement of the piston of the corresponding pump in the direction of expulsion, whereas its injection valve is closed.

A second object of the invention is a system for metering and mixing that is controlled according to the process that is defined above for the metering and the mixing of a product that consists of a first component and a second component that have to be mixed in a mixer at a predetermined metering ratio, whereby the system comprises a first alternating pump that can inject a dose of said first component into the mixer and a second alternating pump that can inject a dose of said second component into said mixture sequentially relative to the first pump, whereby the movement of the piston of each pump can be reversed from a direction of expulsion of the component to a direction of suction and expulsion of the component, and vice versa. An injection valve is inserted between each pump and the mixer, characterized by the fact that it also comprises a programmed controller for initiating the movement of the piston of a pump in the direction of suction and expulsion of the volume of this pump after having determined, following the closing of the injection valve, that the remaining volume in the pump is inadequate for injecting the following dose of the corresponding component into the mixer.

According to other characteristics of the system according to the invention:
Said controller is connected to a movement detector that is associated with each pump to detect continuously the movement of the piston of the pump;
Said movement detector is a linear detector;
The first component is a base and the second component is a catalyst.

Other characteristics and advantages of the invention will emerge from the following description of a non-limiting embodiment of the invention, with reference to the accompanying figures, in which:

DETAILED DESCRIPTION OF THE INVENTION

Figure 1:
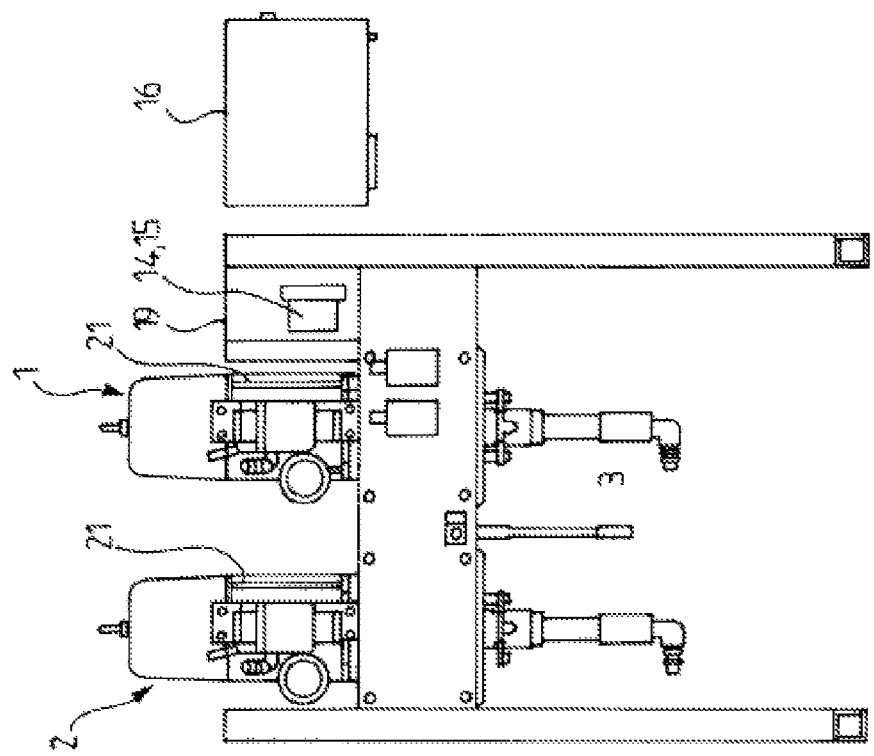
FIG. 1 is a front view of a metering and mixing system according to the invention.
Figure 2:
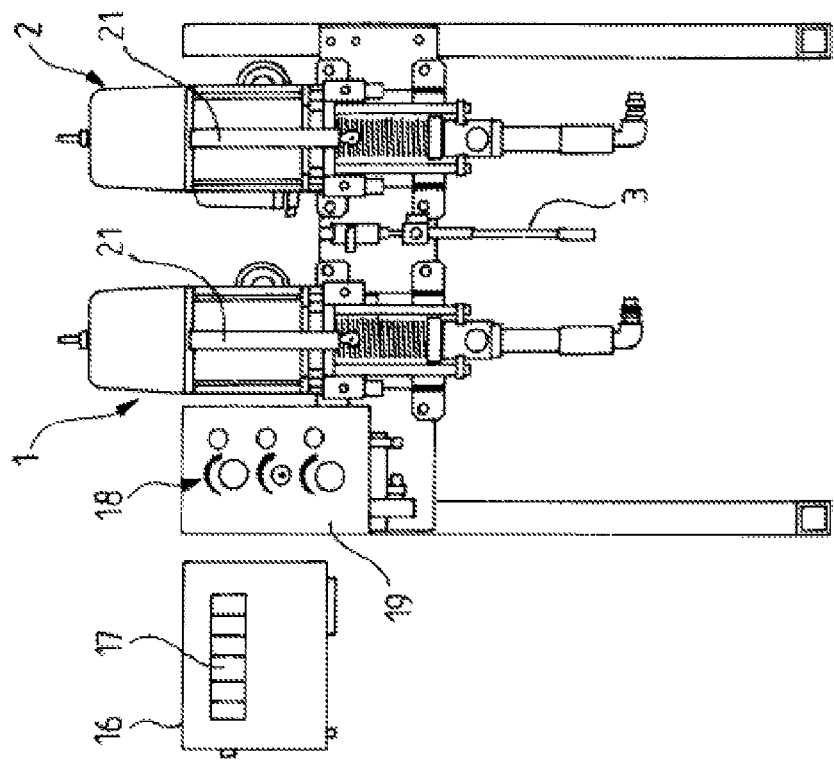
FIG. 2 is a rear view of the metering and mixing system of FIG. 1.

One embodiment of the invention will now be described with reference to figures in which the identical or equivalent elements will have the same references.

The metering and mixing system that is illustrated in the figures is intended for the metering and mixing of a product such as paint, using a spray gun (not shown), whereby this product consists of a first component 4, such as a base, and a second component 5, such as a catalyst. The system comprises a first double-action, alternating pump 1 that contains the first component, and a second double-action, alternating pump 2 that contains the second component. In the illustrated example, the pumps 1 and 2 are pneumatic pumps.

These first and second pumps are able to inject their respective components into a mixer 3 at the outlet of which the mixed product of the two components 4, 5 is distributed, for example by a spray gun (not shown).

Each pump 1, 2 is connected to a reservoir of the respective component 4', 5' (see FIG. 4) by means of a respective intake valve 6, 7. The piston (not shown) of each pump can be moved in a filling direction by drawing in the component (from the bottom to the top in the figures) to fill the volume of the pump when the corresponding intake valve 6, 7 is open by merging the volume of the pump with the respective reservoir 4', 5'.

Then, the piston of the pump can be moved in the other direction, which is an expulsion direction of the component toward the mixer 3 by means of a respective pressure valve 8, 9. Each pump is connected to the mixer 3 by a respective injection valve 10, 11 that can be alternated between an entirely closed position and an entirely open position for the injection. The alternating movement of the pump pistons is indicated by arrows in FIG. 4.

Figure 3:
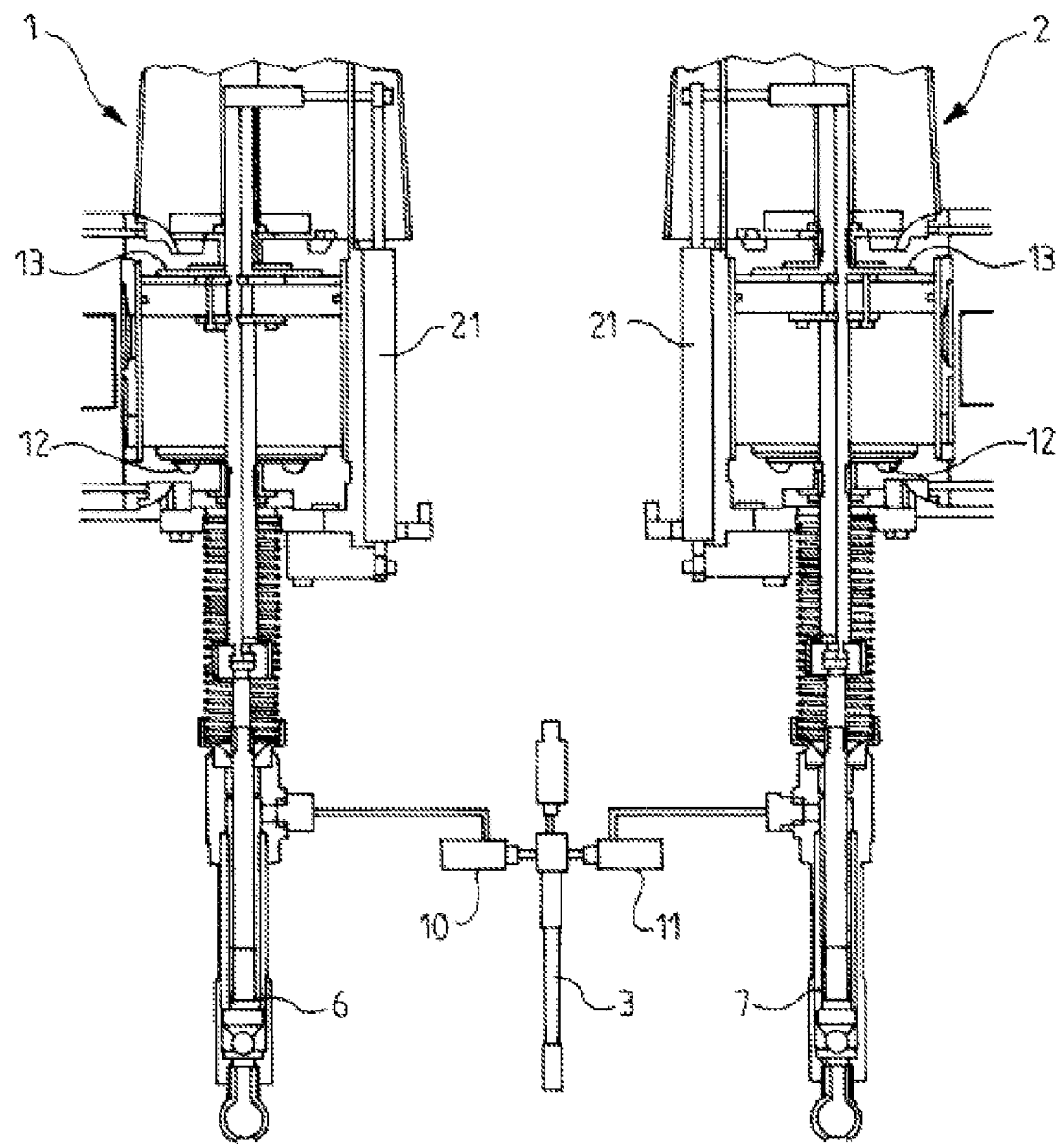
FIG. 3 is a larger-scale partial view of the metering and mixing system according to the invention.

Each pump is electronically provided with a bottom stop 12 and a top stop 13 (see FIG. 3) that defines the end positions of the piston in the two directions.

These bottom and top stops 12, 13 are defined by calibration; these are electronic position stops read by sensors.

Figure 4:
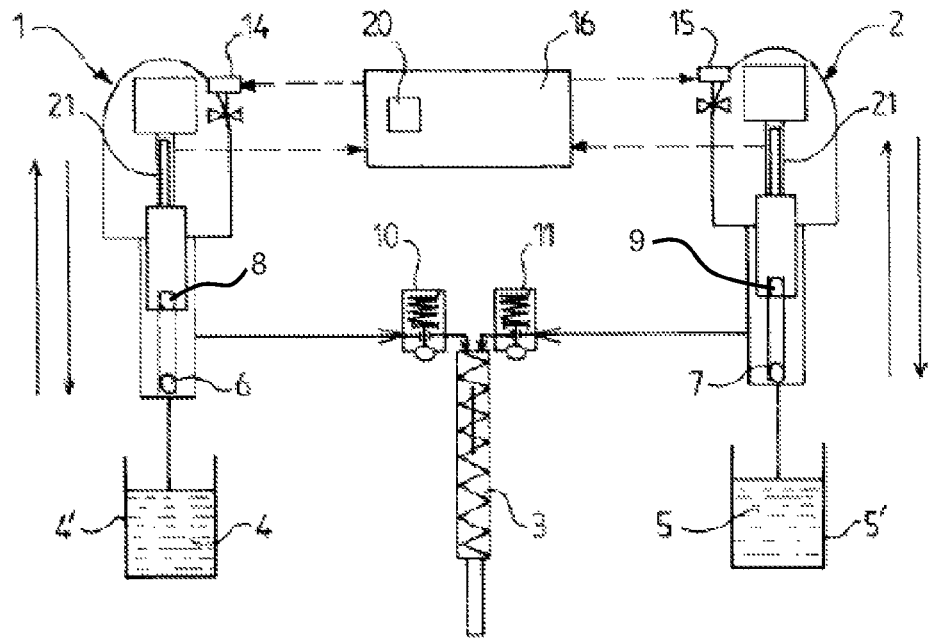
FIG. 4 is a diagrammatic view that illustrates the operation of the metering and mixing system according to the invention.

The reversal of the piston of each pump 1, 2 is initiated in one direction or in the other by a respective solenoid valve 14, 15 (see FIG. 4).

The injection valves 10, 11 and the reverse solenoid valves 14, 15 are all connected to an electronic control box 16 that controls the opening and the closing of injection valves 10, 11 and reverse solenoid valves 14, 15.

The control box 16 comprises a display screen 17 of the values entered using a set of buttons 18 for adjusting and starting/stopping provided on an adjustment panel 19 combined with the control box 16.

Before beginning to use the system, the following adjustments are made using the adjustment panel 19:
  Adjustment of pressure by acting on two air regulators (not shown), one for each pump; this pressure is kept equal in the two pumps 1, 2;
  Adjustment of the metering ratio of the first and second components 4, 5;
  Adjustment of the individual dose that has to be expelled from each pump with each opening of the corresponding injection valve 10, 11. This adjustment is carried out using a potentiometer (not shown).

By way of example, the pressure can be adjusted in a range of 10 to 200 bar, the metering ratio in a range of 1/1 to 20/1, and the dose of each pump in a range of 0.5 cc to 200 cc, whereby the metering ratio is automatically kept at a previously set value.

Furthermore, the precision of the metering is, for example, on the order of +/−3%.

According to the invention, the electronic box 16 comprises a controller 20 that is programmed for initiating the movement of the piston of a pump 1, 2 in the direction of suction and expulsion of the volume of this pump after having determined, following the closing of the injection valve 10 or 11, that the remaining volume in the pump 1, 2 is inadequate for injecting the following dose into the mixer 3.

So as to determine at each moment the remaining volume in each pump 1, 2, the controller 20 is connected to a movement detector 21 that is combined with each pump to detect continuously the movement of the piston of the pump. Thus, the controller is able to calculate exactly the volume of expelled component based on the movement of the piston of each pump and thereby also the remaining volume of the component in the pump.

According to another characteristic of the invention, the movement detector 21 is a linear detector.

Thus, the controller receives an output signal from the detector 21 and at each moment calculates the remaining volume in the pump 1, 2 for determining if the remaining volume is adequate or not for the next injection of a dose. If the remaining volume is not adequate for the following dose, the controller 20 initiates the reversal of the piston of the pump by controlling the solenoid valves 14, 15, before reaching the bottom stop 12 or top stop 13.

The reversal is thus carried out during the injection of the other component from the other pump so as to prevent a drop in pressure and flow rate during the continuous use of the system when one of the pumps is reversed.

Figure 5:
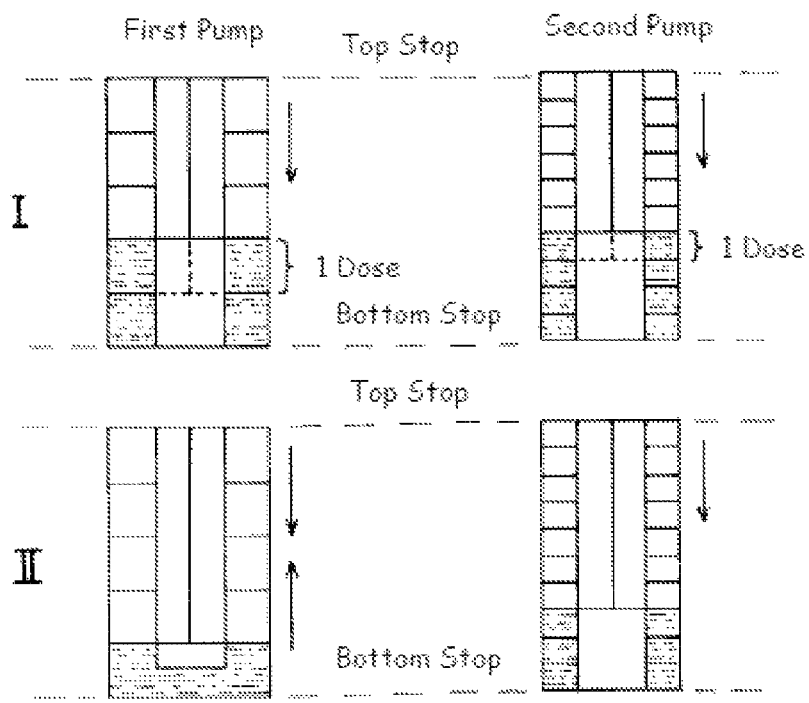
FIG. 5 shows an example of metering two components of a metering and mixing system according to the invention.

FIG. 5 illustrates two different situations I and II. It is seen that the metering ratio between the component of the first pump and that of the second pump is virtually 1:2.

The pumps operate sequentially, which means that during the injection of the component of the first pump into the mixer, the controller makes the second pump wait until the injection valve of the first pump is closed before controlling the injection of the dose from the second pump by opening the injection valve of the latter.

The movement detector of the piston of each pump continuously detects the movement, and its output signal is fed to the controller, which can thus calculate exactly the remaining volume in the pump immediately after the injection valve of the pump is closed.

In situation I, there is an adequate amount of component in the two pumps to carry out the following injection.

In situation II, the remaining volume in the first pump is not enough to inject the following dose, and the controller controls the reversal of the piston of the first pump at the same time that the injection valve of the second pump is open for the injection of the following dose.

In other words, this reversal of the piston for filling the pump is controlled before the piston reaches the bottom stop, whereas the top stop is actuated when the position of the pump has reached a position in which the volume of the pump is filled by the component.

Thus, the reversal of the first pump is carried out at the same time that the second pump carries out the injection of a dose of its component, and vice versa. Consequently, the inversion of the first pump takes place in concurrent operation time. The metering and mixing system operates in a more effective manner because the injection time of the component from a pump is used for filling the other pump when necessary.

Another advantage of the invention resides in the fact that during the injection of the dose from the first pump, it is possible to detect a possible leak in the circuit of the second pump by observing a movement of the piston of the latter whereas its injection valve is closed, and vice versa.

It is thus possible to detect a leak in a pressure valve or in the injection valve by determining a movement of the piston of the pump in the filling direction, whereas its injection valve is closed.

In the same manner, a leak is detected in an intake valve or in the injection valve by determining a movement of the piston of the pump in the expulsion direction, whereas its injection valve is closed.

The controller can also lock a pump that malfunctions, for example if the pump goes out of control, i.e., if its piston moves too quickly relative to the maximum defined speed.

The process and the system are particularly well suited for mixing a first component that consists of a base with a second component that consists of a catalyst.

The invention claimed is:

1. A process for control of a system for metering and mixing a product that consists of a first component and a second component to be mixed in a mixer at a predetermined metering ratio, and the system comprises:
    a first alternating pump that can inject said first component into the mixer,
    a second alternating pump that can inject said second component into said mixer sequentially relative to the first pump, whereby movement of a piston of each pump can be reversed from a direction of suction and expulsion of a corresponding first and second component to a direction of expulsion of the corresponding first and second component and vice versa, and
    an injection valve inserted between each pump and the mixer,
    the process comprising a first injection cycle of the following steps:
        (i) Opening the injection valve of the first pump and carrying out an injection of a predefined dose of the first component into the mixer based on said predetermined metering ratio;
        (ii) Closing the injection valve of the first pump;
        (iii) Opening the injection valve of the second pump and carrying out an injection of a predefined dose of the second component into the mixer based on said predetermined metering ratio; and
        (iv) Closing the injection valve of the second pump so as to end the steps of the first injection cycle;
    Initiating a reversal of the piston of each pump in a direction of suction and expulsion when it is necessary to again fill each pump with the corresponding first and second component; and
    Again opening the injection valve of the first pump to begin additional injection cycles that repeat the above steps (i)-(iv),
    the process further comprising:
    Determining with each closing of an injection valve a volume of component that remains in the corresponding pump, and
    if the remaining volume is inadequate for an injection of a next dose, then reversing movement of the piston of the pump in a direction of suction and expulsion of the corresponding component at the same time that the injection valve of the other pump is open for injection of a dose of the other component into the mixer.

2. The process according to claim 1, wherein the remaining volume in each pump is determined continuously by detecting movement of the piston of the pump.

3. The process according to claim 2, wherein during the injection of the dose from the first pump, a possible leak is detected in a circuit of the second pump, the leak being detected by observing movement of the piston of the second pump when its injection valve (11) is closed, and vice versa.

4. The process according to claim 1, wherein an equal pressure is kept in the first and second pumps.

5. The process according to claim 4, wherein during the injection of the dose from the first pump, a possible leak is detected in a circuit of the second pump, the leak being detected by observing movement of the piston of the second pump when its injection valve is closed, and vice versa.

6. The process according to claim 1, wherein during the injection of the dose from the first pump, a possible leak is detected in a circuit of the second pump, the leak being detected by observing a movement of the piston of the second pump when its injection valve is closed, and vice versa.

7. The process according to claim 6, wherein a leak is detected in a pressure valve or in the associated injection valve by determining a movement of the piston of the corresponding pump in the direction of suction and expulsion, when its injection valve is closed.

8. The process according to claim 6, wherein a leak is detected in an intake valve or in the associated injection valve by determining a movement of the piston of the corresponding pump in the direction of expulsion when its injection valve is closed.

9. A metering and mixing system that is controlled by the process according to claim 1, for metering and mixing of a product that consists of a first component and a second component that have to be mixed in a mixer at a predetermined metering ratio, and the system comprises:
    the first alternating pump that can inject a dose of said first component into the mixer,
    the second alternating pump that can inject a dose of said second component into said mixer sequentially relative to the first pump,
    wherein the movement of the piston of each first and second pump can be reversed from a direction of suction and expulsion of a volume of a corresponding first and second component toward a direction of expulsion of the corresponding first and second component, and vice versa,
    the injection valve inserted between each pump and the mixer and
    a programmed controller for initiating the movement of the piston of each pump in the direction of suction and expulsion of the volume of this pump, after having determined, following closing of the injection valve that the remaining volume in the pump is inadequate for injecting a next dose of the corresponding component into the mixer.

10. The metering and mixing system according to claim 9, wherein said controller is connected to a movement detector that is combined with each pump to continuously detect the movement of the piston of the pump.

11. The metering and mixing system according to claim 10, wherein said movement detector is a linear detector.

12. The metering and mixing system according to claim 11, wherein the first component is a base and the second component is a catalyst.

13. The metering and mixing system according to claim 10, wherein the first component is a base and the second component is a catalyst.

14. The metering and mixing system according to claim 9, wherein the first component is a base and the second component is a catalyst.

* * * * *